July 5, 1966  R. O. WALKER  3,259,020

MACHINE TOOL QUILL CLAMPING MECHANISM

Filed July 20, 1964

*INVENTOR.*
Robert O. Walker

BY
*Howard Heiser*
*& Jack J. Earl*
ATTORNEYS

United States Patent Office 3,259,020
Patented July 5, 1966

3,259,020
MACHINE TOOL QUILL CLAMPING MECHANISM
Robert O. Walker, Cincinnati, Ohio, assignor to The Cincinnati Milling Machine Co., Cincinnati, Ohio, a corporation of Ohio
Filed July 20, 1964, Ser. No. 383,709
6 Claims. (Cl. 90—11)

The present invention relates to machine tool quill mechanisms in which rotatable spindles are supported and more particularly to a clamping mechanism for securing an axially adjustable machine tool quill in selected positions.

It is an object of this invention to provide an improved quill clamping mechanism in a machine tool which will effectively lock a quill in place with a convenient turn of a manually operated knob or handle.

It is also an object of this invention to provide a quill clamp which can be preset for a specific clamping force that can be easily duplicated time after time through the life of the machine.

A further object is to provide a quill clamp in which a maximum clamping force is set to prevent excessive forces and their resultant damage to the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention employs a thin annular section surrounding an axially adjustable quill and the thin section is backed by a fluid cavity which is pressurized to bulge the thin section against the quill to provide the restraint thereon resisting axial movement. It is contemplated that the cavity be filled with a pressure flowable substance which can be characterized as an elastomeric semi-solid mass. For this purpose, it has been found that various compositions of polyvinyl chloride resins are suitable and provide the added advantage of not leaking from the fluid cavity during use due to the elastomeric properties which they have. The use of such plastic substances in clamping devices is not in itself new but is known in the art and detailed disclosures of the specific compounds is not deemed necessary herein. In the present invention, the pressurization of this plastic material is achieved manually through a mechanical device in which a means is provided to limit its effectiveness to a predetermined maximum level so that the maximum pressure in the cavity is positively limited. This has been found to be desirable since in manually actuated devices in use in machine shops it is a common operator practice to use heavy hammers, wrenches or extra length levers (pipes) to operate the devices and there is no way of predicting accurately the amount of force which the operator will use in applying a manually actuated device. In an efficient force transmitting mechanism such as one like the present spindle clamp employing hydraulic principles, the application of excessive force to clamp the quill can very easily result in severe damage to the machine through excessive spindle bearing strains or fractured housings and quills. A clear understanding of the present invention can be obtained from the following detailed description in which reference is made to the attached drawings wherein:

Figure 1:
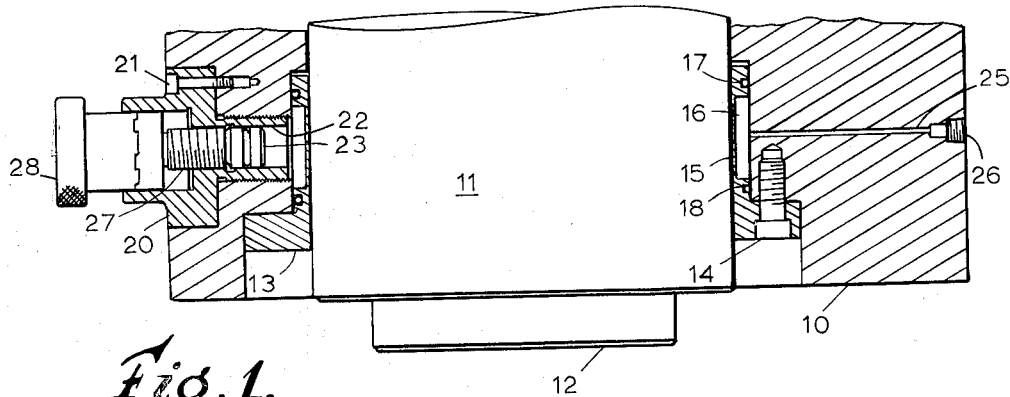
FIG. 1 is a partial longitudinal section of a machine tool spindle carrier having an axially adjustable quill therein.

As shown in the section view of FIG. 1, a spindle carrier housing 10 supports a cylindrical quill member 11 through which a milling spindle 12 is rotatably received. The quill 11 is axially adjustable in the housing 10 through any conventional mechanism to position the spindle 12 at some selected axial position since in these mechanisms, the spindle 12 is supported in bearings (not shown) which are carried at a fixed location in the quill 11. Therefore, the quill 11 is only axially adjustable while the spindle 12 is rotatable through the quill 11. A spindle and quill mechanism of this type is shown in U.S. Patent 3,124,998 and the spindle clamping mechanism of the invention is readily adaptable by those skilled in the art for use with the mechanism shown in the patent. Therefore further detailed description of the spindle 12 and quill 11 and their operation is not deemed necessary herein.

The clamping in the present invention is provided at a bushing 13 that is fixed in the housing 10 by screws 14 and which extends around the quill 11 for loose receipt thereof. The bushing 13 includes a thin annular section 15 that fits close to the quill 11 and extends completely therearound. A space or cavity 16 also of annular shape, is formed between the thin section 15 and the housing 10. The cavity 16 is sealed at each end against fluid leakage by a pair of O rings 17, 18, each extending around the bushing 13 and in contact inside of the housing 10. Pressurization of a hydraulic medium contained in the annular cavity 16 will cause the thin section 15 to bulge toward the quill 11 and to grip that member firmly at an area of contact extending completely around it. This band of gripping area of the bushing 13 when forced against the quill 11 provides an effective restraint on the quill 11 to prevent its axial movement in the housing 10. The effectiveness of the restraint is, of course, proportional to the pressure of the hydraulic medium in the cavity 16 and to the surface conditions of the outside diameter of the quill 11 and inside diameter of bushing 13. By having the thin section 15 of uniform thickness all of way around the quill 11, the clamping mechanism also tends to center the quill in the bore in the housing 10 through which it is received.

Figure 2:
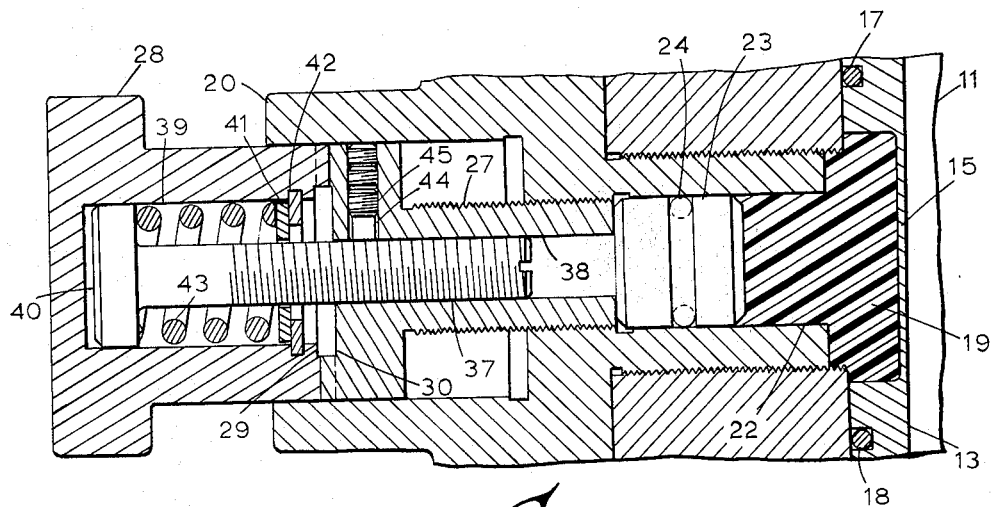
FIG. 2 is an enlarged view of the quill clamping mechanism shown in the section of FIG. 1.

The pressurization of the hydraulic medium 19 that is provided in the cavity 16 is produced by a mechanism that is included in a cylinder member 20 threaded into the housing 10 and fixed in place by screws 21, shown best in FIG. 2. The cylinder member 20 includes a bore 22 that opens at one end into the annular cavity 16 and a piston 23 is slidably received in the other end thereof. The piston 23 includes an O ring seal 24 therearound to resist leakage of the hydraulic medium 19 which fills both the annular cavity 16 as well as the cylinder bore 22 between the piston 23 and the bushing 13, the medium being shown as filling these spaces in FIG. 2 and hatched accordingly for clarity. The hydraulic medium in the preferred embodiment as previously pointed out, is a soft or semi-solid polyvinyl chloride resin having elastomeric properties and being pressure flowable to react according to ordinary hydraulic principles. The material is virtually incompressible also as are the common hydraulic fluids, Having elastomeric properties, the problem of leakage of the material 19 from the spaces in which it is enclosed is virtually eliminated. Various hydraulic fluids and petroleum greases would also work in the clamping mechanism but periodic make-up for loss through leakage would be required and therefore the effectiveness of the mechanism would be impaired and its use complicated to some extent. The material 19 is heated and introduced into the spaces in the mechanism as a liquid and is forced inward through filling ports such as shown at 25, FIG. 1, which are later closed by plugs 26. The piston 23 is not in place at that time to provide a vent for the air which must escape while the spaces are being filled.

The piston 23 is moved forcibly inward toward the bushing 13 to pressurize the material 19 and cause the section 15 to grip the quill 11. The movement of the piston 23 is produced by a mechanical device actuated manually by the machine operator. In the mechanism specifically disclosed, the mechanical device is a screw 27 coaxial with the piston 23, and which is threaded into the cylinder member 20 at the end of the bore 22 opposite to the bushing 13. When rotated in one direction, the screw 27 engages the piston 23 to produce a force that is transmitted directly to the confined material 19 which is then pressurized. A backing or withdrawal of the screw 27 in the other direction removes the pressurizing force and the quill 11 will be released for easy axial movement. A manually rotatable, knurled knob or handle 28 is provided which extends out from the member 20 for access by the operator. The knob 28 is provided with a toothed clutch face 29 that engages a mating face 30 of the screw 27 inside the cylinder member 20. It is through the engagement of these two clutch faces that the screw 27 is rotated in one and the other directions.

Figure 3:
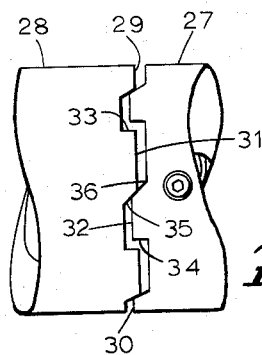
FIG. 3 is a partial view in elevation of the torque limiting clutch used in the mechanism of FIG. 2.

The clutch faces 29, 30 are provided with sets of mating teeth 31, 32, respectively, as shown best in FIG. 3 which provide a positive drive in one direction and which provide a camming action for an overriding drive in the other direction. The screw 27, in the mechanism shown, is a right hand thread and therefore when turned counterclockwise it is withdrawn from the piston 23. The positive drive torque transmission furnished by the clutch teeth 31, 32 in this direction is not overriding since these teeth each have engaging shoulders 33, 34 that are perpendicular to the faces 29, 30 and parallel to the axis of rotation of the knob 28 and screw 27 which also are coaxially arranged as shown. There is no axial separating force that results between the two faces 29, 30 when the knob is rotated counter-clockwise because of this engaging shoulder arrangement. However the teeth 31, 32 are provided with inclined shoulders 35, 36 at the other sides through which torque is transmitted when the knob 28 is rotated clockwise to drive the screw 27 toward the piston 23. Therefore a camming action is provided to separate the faces 29, 30 and this must be resisted by an axial force between the screw 27 and the knob 28. The magnitude of this resisting force is determinative of the maximum amount or magnitude of torque that can be transmitted from the knob 28 to the screw 27 in the clockwise or quill clamping direction and thus also is determinative of the maximum pressure to which the material 19 will be subjected.

The axial force tending to hold the faces 29, 30 engaged is produced by a spring bias mechanism shown in FIG. 2 and enclosed inside the knob 28 and screw 27. It includes a threaded plunger 37 that is adjustably engaged through a threaded bore 38 in the screw 27. The plunger 37 extends into a counter-bore 39 inside the knob 28 and a head 40 is provided on the plunger 37. A washer 41 is retained around the plunger 37 and inside the counter-bore 39 at a location spaced from the head 40 by a snap ring 42. A spring 43 is compressed between the head 40 and washer 41 and transmits a force to the knob 28 tending to hold it in the cylinder member 20 with its face 29 engaged against the face 30 of the screw 27. The amount of compression of the spring 43, and hence the magnitude of the bias force urging the faces 29, 30 together, is dependent upon the spacing of the head 40 and the washer 41 and this is controlled in turn by the amount of the plunger 37 that is engaged in the screw 27. Once a desired force which results in a satisfactory clamping action at the quill 11 has been established, the plunger 37 is fixed in place by a soft dog 44 that is urged through the screw 27 and against the plunger 37 by a set screw 45.

In order for the force to be changed, the entire knob and screw assembly must be removed from the cylinder member 20 to provide access to the screw 45 and plunger 37 so that casual changes in the preset force are not made by the machine operator. If the knob is rotated clockwise until the clutch teeth 29, 30 override each time the quill is clamped, the same clamping force will be used each time and this force will not exceed the predetermined effective safe force.

To illustrate the importance of providing a limiting device in the mechanism, it is pointed out that a mechanism as described has been combined with an axially adjustable quill 11 of 8½ inches diameter and tested for effectiveness of the clamping mechanism. With a ¾ inch diameter piston 23 and cylinder bore 22 and a three-start, ¾ inch—10 National Coarse threaded screw 27, only 25 inch pounds of torque were required to provide a rigid clamp of the quill against a 5000 pound axial thrust force where the thin section 15 was only 1¼ inches wide. This required torque is easily provided manually and can be exceeded with little effort. A greater amount of torque results in excessive deformation of the quill and too high radial loading of the bearings in the quill which support the spindle and this in turn results in ineffective bearing lubrication, heat, and eventual failure of the bearings. The quill itself can be fractured by excessive loading and strain even before rotation of the spindle is started.

While the invention has been described in connection with one form or embodiment thereof, it is to be understood that the present disclosure is illustrative rather than restrictive and that changes and modifications can be made without departing from the spirit of the invention or the scope of the claims which follow.

What is claimed is:

1. In a machine tool having a housing wherein an axially adjustable quill is received, a quill clamping mechanism comprising in combination:
   (a) a bushing fixed in the housing and extending around the quill, said bushing having a thin annular section around the quill and an annular space between said thin section and the housing,
   (b) a cylinder in said housing having a bore opening at one end into said annular space,
   (c) a piston slidably received in the cylinder bore,
   (d) an incompressible, hydraulic medium filling said annular space and cylinder bore between said piston and bushing,
   (e) mechanical means for selectively producing a force to move said piston toward the annular space to pressurize the hydraulic medium therein to bulge said thin section forcibly against the quill whereby a restraint is provided to resist axial movement of the quill, and
   (f) means to limit said force to a predetermined magnitude to prevent excessive pressure in said annular chamber.

2. In a machine tool having a housing wherein an axially adjustable quill is received, a quill clamping mechanism comprising in combination:
   (a) a bushing fixed in the housing and extending around the quill, said bushing having a thin annular section around the quill and an annular space between said thin section and the housing,
   (b) a cylinder in said housing having a bore opening at one end into said annular space,
   (c) a piston slidably received in the cylinder bore,
   (d) an incompressible, pressure flowable material filling said annular space and cylinder bore between said piston and bushing,
   (e) a screw engaged against said piston, and
   (f) means for rotating said screw to move said piston against said pressure flowable material for pressurization thereof to bulge said thin annular section against the quill whereby a restraint is provided to resist axial movement thereof, said means including a torque limiting connection for establishing the maximum pressure level in said annular chamber at a preset value.

3. In a machine tool having a housing wherein an axially adjustable quill is received, a quill clamping mechanism comprising in combination:
(a) a bushing fixed in the housing and extending around the quill, said bushing having a thin annular section around the quill and an annular space between said thin section and the housing,
(b) a cylinder member fixed in said housing and having a bore opening at one end into said annular space,
(c) a piston slidably received in the cylinder bore,
(d) an incompressible, pressure flowable material filling said annular space and cylinder bore between said piston and bushing,
(e) a screw coaxial with said piston and threaded through said cylinder member at the end thereof opposite said bushing to engage against said piston, and
(f) means for rotating said screw one way and the other for movement against and away from said piston, said screw forcing said piston against said incompressible material for pressurization thereof to bulge said thin annular section against the quill to provide a restraint thereon resisting axial movement thereof when said screw is rotated in the one direction, said means including an adjustable coupling adapted to limit the magnitude of rotary force connected to said screw for rotation thereof in said one direction.

4. In a machine tool having a housing wherein axially adjustable quill is received, a quill clamping mechanism comprising in combination:
(a) a bushing fixed in the housing and extending around the quill, said bushing having a thin annular section around the quill and an annular space between said thin section and the housing,
(b) a cylinder member fixed in said housing and having a bore opening at one end into said annular space,
(c) a piston slidably received in the cylinder bore,
(d) an incompressible, pressure flowable material filling said annular space and cylinder bore between said piston and bushing,
(e) a screw coaxial with said piston and threaded through said cylinder member at the end opposite said bushing to engage said piston,
(f) a manually operable knob rotatably received in said cylinder member and extending outward therefrom,
(g) means for connecting said knob to said screw for rotation in unison in one direction to move said screw away from said piston and for rotation in the other direction in unison to transmit only a predetermined maximum magnitude of torque to said screw for movement thereof toward said piston to pressurize the pressure flowable material and forcibly bulge said thin section against the quill thereby providing a restraint on the quill preventing axial movement.

5. In a machine tool having a housing wherein an axially adjustable quill is received, a quill clamping mechanism comprising in combination:
(a) a bushing fixed in the housing and extending around the quill, said bushing having a thin annular section around the quill and an annular space between said thin section and the housing,
(b) a cylinder member fixed in said housing and having a bore opening at one end into said annular space,
(c) a piston slidably received in the cylinder bore,
(d) an incompressible, pressure flowable material filling said annular space and cylinder bore between said piston and bushing,
(e) a screw coaxial with said piston and threaded through said cylinder member at the end opposite said bushing to engage said piston,
(f) a knob coaxial with said screw and extending outward from said cylinder member,
(g) bias means received between said screw and knob for moving said knob against said screw with a predetermined axial thrust force, and
(h) mating toothed interfaces on said screw and knob providing a positive drive in one direction to withdraw said screw away from said piston and an overriding drive in the other direction to provide a positive drive limited in accordance with said axial thrust to move said screw against said piston and pressurize said pressure flowable material to bulge said thin section against the quill to provide a restraint against axial movement thereof.

6. In a machine tool having a housing wherein an axially adjustable quill is received, a quill clamping mechanism comprising in combination:
(a) a bushing fixed in the housing and extending around the quill, said bushing having a thin annular section around the quill and an annular space between the thin section and the housing,
(b) a cylinder member fixed in said housing and having a bore opening at one end into said annular space,
(c) a piston slidably received in the cylinder bore,
(d) an incompressible, pressure flowable material filling said annular space and cylinder bore between said piston and bushing,
(e) a screw coaxial with said piston and threaded through said cylinder member at the end opposite said bushing to engage said piston,
(f) a knob coaxial with said screw and extending outward from said cylinder member,
(g) a threaded plunger engaged in said screw and extending loosely into said knob,
(h) a spring engaged between said plunger and knob and urging said knob toward said screw with an axial thrust dependent upon the strength of said spring and the distance of threaded engagement of said plunger and screw, and
(i) mating toothed interfaces on said screw and knob providing a positive rotational drive therebetween in one direction to withdraw said screw from said piston and an overriding rotational drive in the other direction to provide a positive drive limited in accordance with said axial thrust to move said screw against said piston and pressurize said pressure flowable material to bulge said thin section against the quill and provide a restraint against axial movement thereof.

No references cited.

WILLIAM W. DYER, JR., *Primary Examiner.*
N. ABRAMS, *Assistant Examiner.*